United States Patent
Mukherjee et al.

(10) Patent No.: US 9,510,050 B2
(45) Date of Patent: Nov. 29, 2016

(54) METHOD AND SYSTEM FOR CONTEXT-AWARE RECOMMENDATION

(75) Inventors: Debnath Mukherjee, West Bengal (IN); Snehasis Banerjee, West Bengal (IN); Siddharth Bhattacharya, West Bengal (IN); Prateep Misra, West Bengal (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 0 days.

(21) Appl. No.: 14/128,651

(22) PCT Filed: Jun. 20, 2012

(86) PCT No.: PCT/IN2012/000440
§ 371 (c)(1),
(2), (4) Date: Dec. 23, 2013

(87) PCT Pub. No.: WO2013/046220
PCT Pub. Date: Apr. 4, 2013

(65) Prior Publication Data
US 2014/0123165 A1    May 1, 2014

(30) Foreign Application Priority Data
Jun. 28, 2011   (IN) .......................... 1872/MUM/2011

(51) Int. Cl.
| | | |
|---|---|---|
| *H04N 21/466* | (2011.01) | |
| *H04N 21/258* | (2011.01) | |
| *H04N 21/25* | (2011.01) | |
| *H04N 21/442* | (2011.01) | |

(Continued)

(52) U.S. Cl.
CPC .... *H04N 21/4668* (2013.01); *G06F 17/30029* (2013.01); *H04N 21/251* (2013.01); *H04N 21/25891* (2013.01); *H04N 21/44222* (2013.01); *H04N 21/4532* (2013.01); *H04N 21/466* (2013.01); *H04N 21/4662* (2013.01); *H04N 21/4667* (2013.01); *H04N 21/4755* (2013.01); *H04N 21/4826* (2013.01)

(58) Field of Classification Search
CPC ............... H04N 21/45; H04N 21/466; H04N 21/4668; H04N 21/25891; H04N 21/4532
See application file for complete search history.

(56) References Cited

U.S. PATENT DOCUMENTS

| | | | |
|---|---|---|---|
| 5,223,924 A | | 6/1993 | Strubbe et al. |
| 5,734,720 A | * | 3/1998 | Salganicoff .......... G06Q 20/383 348/E7.056 |

(Continued)

FOREIGN PATENT DOCUMENTS

| | | |
|---|---|---|
| EP | 1906316 A1 | 4/2008 |
| WO | 2007024736 A2 | 3/2007 |

OTHER PUBLICATIONS

Shang H. Hsu et al , "AIMED—A personalized TV recommendation system" 2007.

(Continued)

*Primary Examiner* — Robert Hance
(74) *Attorney, Agent, or Firm* — Thompson Hine LLP

(57) ABSTRACT

A context aware recommendation system and method for recommending at least one program to the user responsive to dynamically varying user preferences, learned user behavior and contextual information is described. The recommended program is a television program, radio program or music file. The system and method further alert the user about change in user's preferences and guides the user to change stated preferences.

19 Claims, 2 Drawing Sheets

(51) Int. Cl.
*H04N 21/45* (2011.01)
*H04N 21/475* (2011.01)
*G06F 17/30* (2006.01)
*H04N 21/482* (2011.01)

(56) References Cited

U.S. PATENT DOCUMENTS

| | | | |
|---|---|---|---|
| 7,581,237 | B1 | 8/2009 | Kurapati et al. |
| 7,657,906 | B2 | 2/2010 | Icho et al. |
| 8,073,794 | B2 | 12/2011 | Amer-Yahia et al. |
| 8,190,442 | B2 | 5/2012 | Morel et al. |
| 8,359,280 | B2 | 1/2013 | Yu et al. |
| 8,370,203 | B2 | 2/2013 | Dicker et al. |
| 8,384,743 | B2 | 2/2013 | Gorti et al. |
| 8,843,965 | B1* | 9/2014 | Kurapati ............ H04N 5/44543 725/37 |
| 2002/0104087 | A1* | 8/2002 | Schaffer ................ H04N 7/163 725/46 |
| 2003/0084450 | A1 | 5/2003 | Thurston et al. |
| 2004/0003392 | A1* | 1/2004 | Trajkovic ............... H04N 7/163 725/10 |
| 2006/0100987 | A1* | 5/2006 | Leurs ................ H04N 5/44543 |
| 2006/0206912 | A1* | 9/2006 | Klarfeld ............... G11B 27/105 725/40 |
| 2007/0039023 | A1 | 2/2007 | Kataoka et al. |
| 2007/0250848 | A1 | 10/2007 | Gorti et al. |
| 2008/0154848 | A1* | 6/2008 | Haslam ............. G06F 17/30011 |
| 2009/0018845 | A1 | 1/2009 | Morel et al. |
| 2009/0164400 | A1 | 6/2009 | Amer-Yahia et al. |
| 2009/0292672 | A1* | 11/2009 | Kunjithapatham  G06F 17/30038 |
| 2010/0114930 | A1 | 5/2010 | Kalasapur |
| 2010/0191582 | A1* | 7/2010 | Dicker .................. G06Q 30/02 705/14.51 |
| 2010/0235317 | A1 | 9/2010 | Yu et al. |
| 2010/0333137 | A1* | 12/2010 | Hamano ................ H04H 60/46 725/39 |

OTHER PUBLICATIONS

Ivan Cantador et al, Universidad Autónoma De Madrid, "An enhanced semantic layer for hybrid recommender systems: Application to News Recommendation".
Gizem Öztürk, "A hybrid video recommendation system based on a graph-based algorithm" Sep. 16, 2010.
International Search Report, PCT/IN2012/000440 (Mar. 22, 2013).
Bjelica, Milan, "Towards TV Recommender System: Experiments with User Modeling," *IEEE Transactions on Consumer Electronics*, vol. 56, No. 3, pp. 1763-1769 (Aug. 2010).

* cited by examiner

METHOD AND SYSTEM FOR CONTEXT-AWARE RECOMMENDATION

FIELD OF THE INVENTION

The present invention relates to a context-aware recommender system and more particularly to a system and method for recommending programs considering the user's context, preferences and viewing behavior.

BACKGROUND OF THE INVENTION

Broadcasting is a process for transmitting audio/video signals from the transmitter to the receiver. The transmission of signals provides accessibility of contents to the receiver placed in any household environment. For example, the communication device such as set-top box, in case of a television program, is configured to receive the signal from the transmitter and provide accessibility of the contents by using a television set. The most commonly used set-top boxes are adapted to receive encoded/compressed digital signals from the signal source and decode those signals into analog signals.

In current scenario televised entertainment broadcasting has seen a proliferation of new channel launches and they are added in one or more genres of hundreds of preexisting channels.

The genres are basically categorized according to age, interest and subject of broadcasted contents. The user has to browse through the graphical user interface to access his program of interest. Browsing for various channels will lead to increased duration of time for user to get to the channel of his interest. The set top box is configured with various software applications, recommender system to enable user in reducing time to access the preferred channels.

The recommender system is configured to recommend the user's interest by predicting the rating or preferences of the user. The recommender system uses various approaches such as content based approach, collaborative based approach and hybrid based approach to recommend the program. The most common approach used by the recommender system is to learn the behavior of the user. In such an approach, the user's viewing behavior is stored for a watched program and if the recommender system is based on the learned behavior only, and in case a program of interest to the user is not scheduled for a month, the interest of the user for a particular program will not be captured and stored and thus when after a month of training the program of interest to the user is available, the recommender system will not recommend the program of user interest.

For example consider a user interested in tennis, but there is no major tennis match scheduled for the next one month. During this month, the user's behavior does not reflect the user's interest in tennis. Thus when a tennis match is scheduled, the match is not recommended to the user.

There thus exists a need for the system to recommend programs to the user based on the user specified preferences.

The system facility of prompting the user to update the preferences if the system detects that the user's preferences are no longer relevant to his behavior is also unaddressed in the prior art.

In some of the prior arts, references to certain aspects related to learning behavior are disclosed. However, the recommendation based on the user specified preferences and a procedure to prompt the user for significant changes in user's profile still remains unaddressed.

A US Patent Application US20090018845 by Morel et al mentions content alarm processing before recommending to user on a basis of the current content, but, it doesn't disclose the ways of prompting the user for significant changes in user's profile.

In U.S. Pat. No. 8,073,794, Amer-Yahia, et al mentions about how items or people of potential interest to users may be determined based at least in part on implied social network information, but, it doesn't disclose a recommendation system that is based on user specified preferences. Also there is no mention of prompting the user of significant changes in user's profile.

In "Towards TV Recommender System: Experiments with User Modeling" (IEEE Transactions on Consumer Electronics, Vol 56, No 3, August 2010), the author describes a TV recommender system based on behavior learning using cluster hypothesis. However, it does not consider stated user preferences and context-aware recommendations.

In U.S. patent application Ser. No. 12/266,273, the system do not report ability to detect change in user's preferences and guide the user to make changes in preferences.

Thus there exists a need for a recommendation system that recommends programs based on user preferences, learned user behavior and contextual information and further prompts the user for significant changes in the user's profile.

Object of the Invention

The principal object of present invention is to provide a context aware recommendation system for recommending programs that is responsive to dynamically varying user preferences, learned user behavior and user contextual information.

Another object of the present invention provides an intelligent recommender system that factors in user's interest and dynamic viewing behavior and also the context in which the user is situated.

Yet another object of the present invention is to provide a system and method for updating the user preferences for significant deviations from the user stated preferences.

One other object of the present invention is to provide a system and method that recommends the program to the user irrespective of availability of databases containing similar user's rating for the program.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention provides a context aware method of recommending at least one program responsive to dynamically varying user preferences, learned user behavior and user contextual information, comprising: capturing the user's preferences based on a set of features representative of plurality of the programs and storing the preferences in a normalized format; capturing the user contextual information and retrieving corresponding contextual user model from a plurality of user models derived and stored against each combination of context; retrieving currently running programs along with their genre vectors, storing the genre vectors in a normalized format, and for the genre vector reported to be present assigning a positive score thereof; comparing the captured user preference against each program vector of the currently running programs for deriving a first to-be-recommended list, and comparing the contextual user model against each program vector for deriving a second to-be-recommended list; and recommending a final list to the user derived by combining the first and the second to-be-recommended program list.

A context aware recommendation system for recommending programs responsive to dynamically varying user preferences, learned user behavior and user contextual information, the system comprising: a user preference module configured for capturing the user's preferences based on a set of features representative of plurality of the programs and storing the preferences in a normalized format; a context capture module configured for capturing the user contextual information and retrieving corresponding contextual user model from a plurality of user models derived and stored against each combination of context; means for retrieving currently running programs along with their genre vectors, storing the genre vectors in a normalized format; and a comparator configured for comparing the captured user preference and the contextual user model against each program vector of the currently running programs for deriving corresponding set of to-be-recommended lists.

BRIEF DESCRIPTION OF THE DRAWINGS

These and other features of the invention will now be described with reference to the drawings summarized below. These drawings and the associated description are provided to illustrate a preferred embodiment of the invention, and not to limit the scope of the invention.

DETAILED DESCRIPTION OF THE INVENTION

Figure 1:
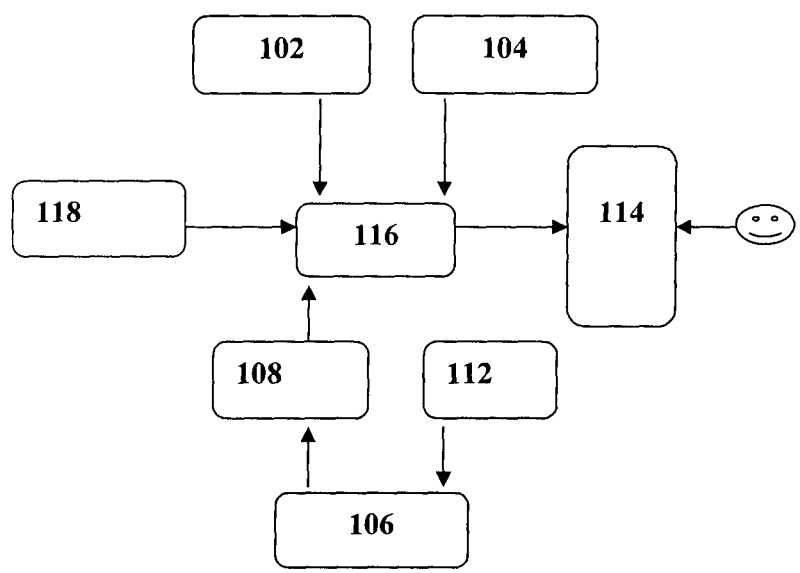
FIG. 1 illustrates the recommendation system architecture for recommending program to the user according to one exemplary embodiment of the invention.

Some embodiments of this invention, illustrating all its features, will now be discussed in detail.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. As one skilled in the art will appreciate, most digital computer systems can be installed with the present invention. To the extent that a particular computer system configuration is programmed to implement the present invention, it becomes a digital computer system within the scope and spirit of the present invention. That is, once a digital computer system is programmed to perform particular functions pursuant to computer-executable instructions from program software that implements the invention described heretofore, it in effect becomes a special purpose computer particular to the present invention. The necessary programming-related techniques are well known to those skilled in the art and thus are not further described herein for the sake of brevity.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The following description focuses on embodiments of the invention applicable to a recommendation device for programs but it will be appreciated that the invention is not limited to this application but may be applied to recommendations of many other types of content items including for example radio programs or music files.

The term 'cosine similarity' used herein in the description is merely exemplary in nature and is in no way intended to limit the invention, its application, or uses. The cosine similarity can be interchanged with another similarity measures, known to the person having ordinary skill in the art.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The various features and method described above may be used independently of one another, or may be combined in various ways. All possible combinations and sub-combinations are intended to fall within the scope of this disclosure. In addition, certain method or process steps may be omitted in some implementations.

Further, certain terminology is used herein for convenience only and is not to be taken as a limitation on the embodiments of the present invention. A program, for the purposes of the application, includes series of future events, items or performances.

The present invention provides a context aware recommendation system for recommending at least one program responsive to dynamically varying user preferences, learned user behavior and user contextual information, the system comprising: a user preference module configured for capturing the user's preferences based on a set of features representative of plurality of the programs and storing the preferences in a normalized format; a context capture module configured for capturing the user contextual information; means for retrieving currently running programs along with their genre vectors, storing the genre vectors in a normalized format; a comparator configured for mapping the captured user preference and the contextual user model against each program vector of the currently running programs for deriving corresponding set of to be recommended lists; and a user model storage configured for generating and storing different instances of the user model for the different contextual information.

The present invention provides a context aware method of recommending at least one program responsive to dynamically varying user preferences, learned user behavior and user contextual information, comprising: capturing the user's preferences based on a set of features representative of plurality of the programs and storing the preferences thereof; capturing the user contextual information and retrieving corresponding contextual user model from a plurality of user models derived and stored against each combination of context; retrieving currently running programs along with their genre vectors, storing the genre vectors in a normalized format, and for the genre vector reported to be present assigning a positive score thereof; comparing the captured user preference against each program vector of the currently running programs for deriving a first to be recommended list, and comparing the contextual user model against each program vector for deriving a second to be recommended list; and recommending a final list to the user derived by combining the first and the second to be recommended program list.

In another embodiment of the invention the recommended program is a television program, radio programs or a music file. Thus, for example, it will be appreciated by those ordinary skilled in the art that various modules of present context aware recommendation system are though explained in context of television programs that utilizes a set top box for implementing the recommendation method, nevertheless the functions of these modules may also be provided through the use of dedicated hardware, capable of executing the recommendation process for radio and music files.

FIG. 1 illustrates a context aware recommendation system 100 for recommending at least one program responsive to dynamically varying user preferences, learned user behavior wherein the system is hosted in to a set top box for a television program, or any other dedicated hardware capable of executing the recommendation process for music and radio files. Those of ordinary skilled in the art further understand that the exemplary set top box as a hardware and the process embedded therein is for illustrative purposes only and, thus is not intended to be limited to television programs only.

The context aware recommendation system 100 comprises a context capture module 102, a user preference module 104, a behavior learning module 106, a user model storage 108, a program history database 112, an user interface module 114, a comparator 116, a retrieving module (means for retrieving) (not shown in figure) and an electronic program guide 118. The system 100 further comprises a contextual program history module (not shown in figure) configured to store last followed program vectors by the user in a particular context.

The system 100 further comprises a program history module (not shown in figure) configured to store last followed program vectors by the user devoid of the context.

In another embodiment of the invention the system 100 further provides determining the learned user behavior based on a contextual program history, in the steps of: storing last followed program vectors by the user in a particular context in the contextual program history module, and last followed program vector by the user devoid of the context in the program history module; and for the number of followed program vectors in the particular context and the number of followed program vectors devoid of any context, exceeding than a predetermined threshold, deleting oldest followed program therefrom.

In another embodiment of the invention the context capture module 102 is configured to capture and identify a current context of the user. The context of the user comprises such as what is the time of day, day of week, holidays, companion etc and also captures the conditions and circumstances that are relevant to the recommendation scenario.

In another embodiment of the invention the retrieving module (not shown in figure) configured for retrieving a currently running program along with their genre vectors ("educational, "science", "romance" or "action"), storing the genre vectors in a normalized format.

In another embodiment of the invention the user preference module 104 is configured for capturing the user preference through the user interface module 114 and creating a preference vector for the captured user preferences. The user interface module 114 of recommender system 100 interacts with the external world.

In another embodiment of the invention the user preferences are determined based on the time spent following the program, wherein for the time spent exceeding a certain fraction of program duration, liking the program and adding to the user preference thereof.

In another embodiment of the invention the behavior learning module 106 configured to learn a behavior of the user based on the current context and program viewed. The behavior learning module 106 learns a model of the user based on the program history and stores the results in the user model storage 108 wherein the user model storage 108 is configured for generation and storing of different instances of the user model for the different contexts.

In another embodiment of the invention the behavior learning is done by considering the characteristics of the program such as genre and other features.

In another embodiment of the invention the features determining the user's preferences includes but are not limited to genre of the program, keywords of the plot. In addition, the features can include actor, director, producer, animator etc.

In another preferred embodiment of the invention the behavior learning is also determined based on the time spent viewing the program, wherein for the time spent exceeding a certain predetermined fraction of program duration, determining that the user likes the program and adding to the user model.

In another embodiment of the invention the features determining the user model but are not limited to genre of the program, keywords of the plot. In addition, the features can include actor, director, producer, animator etc In another embodiment of the invention user action such as selection of program by a user is stored in the program history database 112.

In another embodiment of the invention the system 100 is adapted to take inputs from the user preference module 104, the user context module 102 and the electronic program guide 118.

In another embodiment of the invention the comparator 116 comprising a first comparator and a second comparator (not shown in figure) is configured for comparing the captured user preference and the contextual user model against each program vector of the currently running programs for deriving corresponding set of to be recommended lists.

In another embodiment of the invention the first comparator is configured for comparing the user preference vector with the genre vector of currently running program, further generating a first sorted list in a descending order of similarity, wherein the said comparison is characterized by cosine similarity of the said vectors or other similarity measuring methods.

In another embodiment of the invention the second comparator is configured for comparing the learnt user model with the genre vector of currently running program, further generating a second sorted list in a descending order of similarity, wherein the said comparison is characterized by cosine similarity of the said vectors.

In another embodiment of the invention, the user model is calculated as centroid of cluster formed by the program vectors in the program history.

In another embodiment of the invention system 100 further comprises learning of user preferences via using social web analysis. In particular, the system accesses the user's preferred programs mentioned in the user's social network profiles.

Some social network sites allow users to maintain their preferences of programs, movie, music etc. The system can connect to the social network site (using login credentials provided by the user) and extract the latest preferences to another server. Later, the system downloads the said latest preferences and updates the local user preference storage.

Consider that a window of "w" programs is stored in the program history database 112. When a new program is watched, its program vector is put into program history and the earliest program in the program history is removed from the window.

Figure 2:
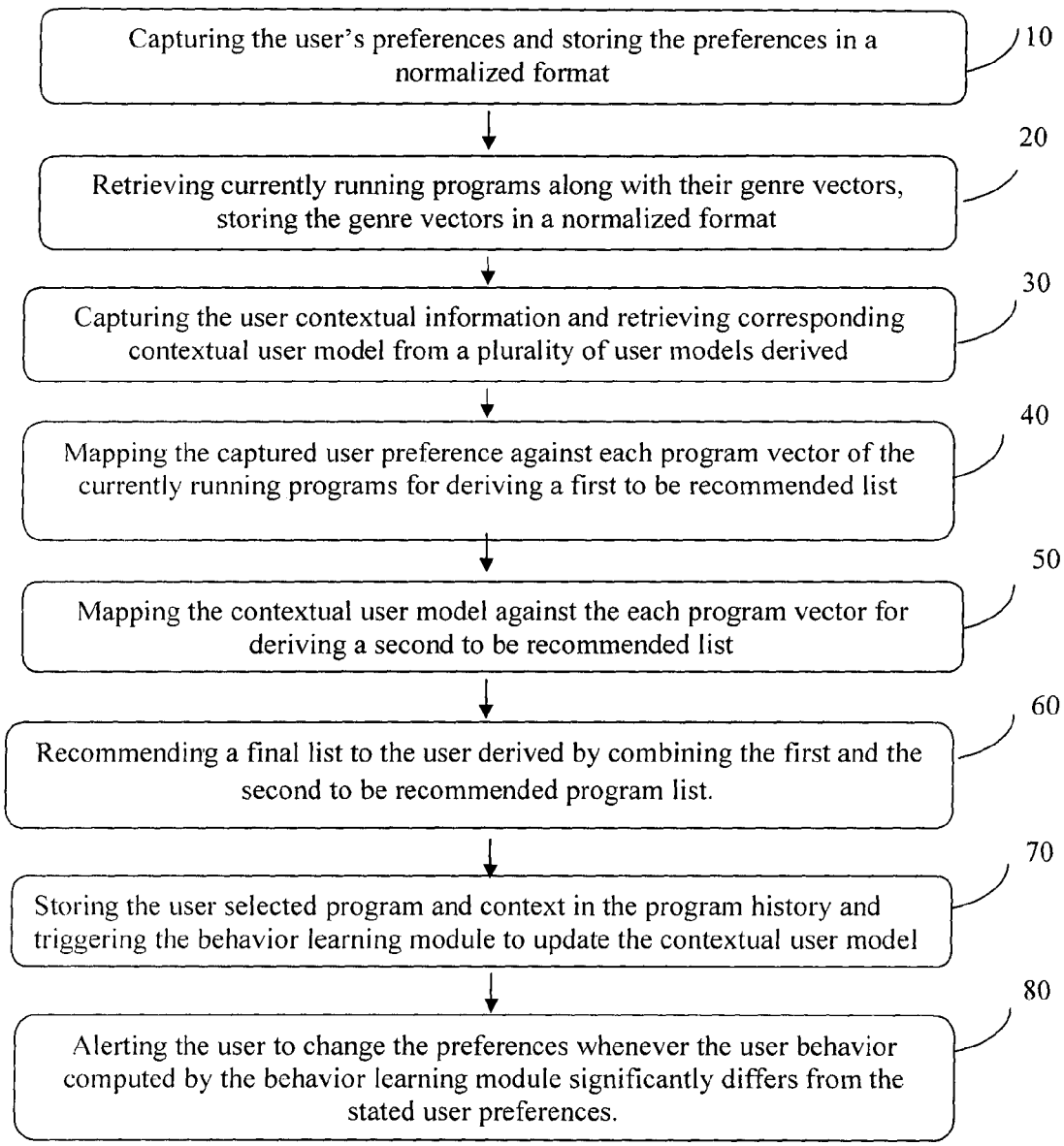
FIG. 2 illustrates the method for recommending the program to the user according to one exemplary embodiment of the invention.

FIG. 2 illustrates a flow diagram of method for recommending at least one program responsive to dynamically varying user preferences, learned user behavior and user contextual information according to various exemplary embodiments of the invention. In the initial step 10 of the proposed method, the user's preferences are captured based on a set of features representative of plurality of the programs and storing the preferences in a normalized format. In next step 20, currently running programs along with their genre vectors are retrieved; stored as the genre vectors in a normalized format, and for the genre vector that is reported to be present thereof positive score is assigned. In the next step 30, the user contextual information is captured and corresponding contextual user model from a plurality of user models derived is retrieved which is then stored against each combination of context. In next step 40, the captured user preference is compared against each program vector of the currently running programs for deriving a first to be recommended list. In step 50, the contextual user model is compared against each program vector for deriving a second to be recommended list. In step 60 of the proposed method, a final list to the user derived by combining the first and the second to be recommended program list is recommended. In step 70, the user selected program and context is fed into the program history and the behavior learning module to update the contextual user model is triggered. In final step 80, the user is alerted to change the preferences whenever the user behavior computed by the behavior learning module significantly differs from the stated user preferences.

In another embodiment of the invention, say the cosine similarity of the user preferences vector U{u1, u2 ... un} is found with each of 'z' program vectors {P1, P2, P3 ... Pz) in program history where Pj={Pj1, Pj2, ... Pjn}, and if the cosine similarity values in all cases is less than a predefined threshold "t", then user is prompted with an alert to change the user preference. The user preference is said to "significantly differ" from the user behavior if all the cosine similarity values are less than the predefined threshold "t".

In another embodiment of the invention the system 100 is adapted to alert user of stated user preference changes. If a user has significantly deviated from his stated behavior constantly for a significant period of time, the user is guided as to what preferences have changed so that the user can update the same.

Consider example for a user which has stated earlier that he likes "Animation" only, but for last two months the user has not watched any "Animation" movie, and has started watching "Drama" movies, then the system will alert the user about the change, and tell the user to decrease rating for "Animation" and increase rating for "Drama.

Working Example of the Invention

In order to check the performance of the method and system for recommendation a user study was conducted, the details of the user study are as below:

A web-based application was developed to simulate a system that recommends a small subset of movies from the set of currently running movies in different television channels. However, the description is only for illustrative purposes and in no way restricted to television channels, but radio programs and music files. For example, the process when implemented on a dedicated hardware may enable it to recommend the user program of genres selected from, and not limited to, music channels, news channels, talk radio, weather radio, or sports radio.

Referring to table 1 illustrating the web based application enabling the user to select the movie of a particular genre to watch. The application also gives a description of the movie based upon which the user can decide the content to watch.

An experiment using a publicly available movie data base is conducted. Participants in the experiment submitted their preferences of genres of movie. A list of movies is presented to choose from. Along with the list of movies, they are presented with current context, such as "with family"/"with friends". They are also presented a set of recommended movies. The participants either chose a movie from the recommended set or from the other movies available. The responses of the participants are fed back into the behavior learning module.

In another experiment, the context is presented to the participant in the experiment, but not recorded while storing in the program history.

It is observed that the participants chose more programs from the recommended set when context was recorded than when context was not recorded.

---

Which move will you like to watch under Context: Wednesday Night?
If you don't like the following Recommendations, select a Genre below to see Movies:

| | | | | |
|---|---|---|---|---|
| ○ Action | ○ Adventure | ○ Animation | ○ Biography | ○ Comedy |
| ○ Crime | ○ Documentary | ○ Drama | ○ Family | ○ Fantasy |
| ⊙ History | ○ Horrow | ○ Musical | ○ Mystery | ○ Romance |
| ○ Sci-Fi | ○ Sport | ○ Thriller | ○ War | ○ Western |

Give a rating to recommendations:
○ Bad  ○ Indifferent  ○ Good  ○ Very Good
○ Submit

TABLE 1

| Movie Name | Genre | Description |
| --- | --- | --- |
| Event, the | Crime, Drama, Mystery, Sci-FI, Thriller | When a man goes looking for his missing girlfriend, he stumbles up on a government conspiracy that is bigger than president himself |
| Escape from New york | Action, Adventure, Crimes, Sci-Fi, Thriller | In 1997, when the US president crashes into Manhattan, now a giant max security prison, a convicted bank robber is sent in for rescue |
| Terminator 3, Rise of Machine | Action , Sci-FI, Thriller | John Connor is now in his 20's and female terminator called T-X or Terminatrix is after him. Another t-101 is sent back through time to protect John once again on verge of the rise of the machines |
| Fantastic Four | Action, Adventure, Fantasy, Sci-Fi | A group of astronauts gain super powers after a cosmic radiation exposure and must seen them to oppose the plans of their enemy, Doctor Victor Von Doom |
| Loaded weapon 1 | Action, Comedy, Crime | An LA detective is murdered because she has microfilm with recipe to make cocaine cookies. A lethal |
| Bridge too Far A, | Action, Drama, History, War Biography, Drama | An historic telling of the failed attempt to capture several bridge to Germany in World War 2 in a campaign called operation market-garden |
| Wilson | History, Music, Romance | A chronicles of the political career of US President Woodrow Wilson |

To verify the accuracy of user-preference based recommendations. "Biography" genre movies are excluded in the first 20 pages shown to a user who has high preference for biography. On the 21st page biography genre movies are shown—it was immediately recommended on the 21st page. In a separate experiment user preference based recommendation is disabled thus basing the recommendation on learning only. Biography is not recommended to the user in this case, in the same scenario as above In another experiment, the user's preference was given as "sci-fi" only, but in the user study "horror" movies were chosen. The system gave an alert to the user to update the preferences to increase the preference for the genre "horror" and decrease the rating for "sci-fi".

A history of the programs watched by the user is maintained. The number of items in the history is a configurable parameter in the present system. The representation of a television program is based on its genre, expressed as an n-dimensional vector.

Consider the following genre vector:

{Action, Adventure, Animation, Biography, Comedy, Crime}

Then the program "Indiana Jones" will be rated as:

{1, 1, 0, 0, 1, 0}

In the above example, 1 means presence of a genre, 0 means absence of a genre. Here the genre is a 6-dimensional vector.

The Recommendation system captures user preferences based on the genres. User preference is also modeled as a vector. For example, the user preference of user "John" may look like:

{4, 2, 0, 0, 7, 0} where John has rated his preference for a genre on a scale of 10.

The user preference is stored in a normalized format. After normalization, the user preference vector looks like:

{0.48, 0.24, 0, 0, 0.84, 0}

The history of programs watched is stored as normalized vectors. The User Model U is obtained as a function of the program vectors stored in the program history. U is a normalized vector (u1, u2 . . . uN).

The user model is calculated as the centroid of a cluster formed by the program vectors in the program history. The centroid itself is calculated by first averaging and then normalizing the feature values for each of the program vectors in the program history. In our implementation, we give equal weights to each program in the program history. Note that a window of "w" programs is stored in history. When a new program is watched, its program vector is put into the program history and the earliest program in the history is removed from the window.

To incorporate context, it is observed that a user will behave differently in different context. Thus the contextual user model is modeled as a function f:

$$f(X, C_i) = u_i, i=1 \ldots t$$

Where $C_i$ is a context vector and $u_i$ is a user model. The function is dependent on the user X. There are t contexts. This function can be implemented e.g. as a lookup table.

The context vector is a g-dimensional vector where each dimension of the vector represents a context attribute. A context attribute is an individual context such as "holiday", "morning", "noon", "evening", "late night". The context is represented as a vector which takes 0/1 (binary) attribute values. Corresponding to each context combination there is a user model, for a given user. In the present approach different user models for a particular context combination for a particular user is learnt and stored.

Having learned the user model, to give a recommendation under a certain context C for a user X, the cosine similarity of the learnt user model for the particular context with the candidate programs obtained from an Electronic Program Guide—EPG that are currently airing or about to start, is computed. The algorithm reports the "top k" programs P learnt for the user based on behavior learning, by choosing the k programs with the highest similarity.

Separately, the set of recommended programs based on the user preferences is computed. To do this, the cosine similarity between the user preference vector and the candidate programs is derived at and the "top m" programs based on user preferences are obtained.

In a final step the union of P learnt and P pref is obtained to obtain the final set of programs P:

$$P = P_{pref} \cup P_{learnt}$$

The information about user preferences and program history is used to detect significant deviations from user preferences. If significant deviation is detected, then the system prompts the user to update his/her preferences and also guides the user to make better user preference selection.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

We claim:

1. A method for recommending a program to a user, the method comprising:
    capturing user preferences stated by the user, wherein the user preferences are based on a set of features;
    storing the user preferences in a normalized format;
    receiving program vectors associated with currently running programs, wherein at least one program vector from amongst the program vectors is a n-dimensional vector, wherein the program vectors are stored in normalized format;
    capturing a user model based on programs followed by a user in a given context, wherein the user model is calculated as a centroid of a cluster formed by the program vectors in a program history;
    generating one or more contextual user models by updating the user model based on a user behavior corresponding to combination of one or more contexts, wherein the one or more contextual user models are generated based on a function f given as $f(X, C_i)=u_i$, and i=1 . . . t, and wherein X is the user, Ci is a context vector, $u_i$ is a user model and t is number of contexts;
    retrieving a contextual user model from the one or more contextual user models corresponding to a current context associated with the user;
    comparing the user preferences against a program vector of the currently running programs for deriving a first to be recommended list;
    comparing the contextual user model against a program vector of the currently running programs for deriving a second to be recommended list;
    recommending a final list to the user derived by executing a union operation of the first to be recommended list and the second to be recommended list; and
    alerting the user on detection of a significant difference between the user behavior and the user preferences and guiding the user to modify the user preferences, wherein significant difference is detected when cosine similarity values of all the programs in the program history with the user preferences are less than a predefined threshold and wherein the receiving, the capturing, the retrieving, the comparing, and the recommending are performed by a computer system programmed with computer-executable instructions.

2. The method of claim 1, further comprising determining a learnt user behavior based on a contextual program history based on, program vectors followed by the user in a context, and program vectors followed by the user devoid of the context.

3. The method of claim 1, further comprising prompting the user for updating the user preferences for significant deviations from the user preferences.

4. The method of claim 1, wherein the program is a television program, a radio program, or a music file.

5. The method according to claim 1, further comprising storing a user selected program and the context in a program memory; and updating the one or more contextual user models.

6. The method according to claim 1 further comprising learning of the user preferences using a social web analytics.

7. The method according to claim 2, further comprising alerting and guiding the user to change the user preferences whenever the learnt user behavior so computed differs from the stated user preferences.

8. The method of claim 1, wherein the user preferences are related to set of features selected from a group comprising of genre of the program, keywords of the plot, actor, director, producer, and animator.

9. The method of claim 1, wherein the user preferences are determined based on the time spent following the program when the time spent following the program exceeds a certain fraction of program duration.

10. The method of claim 1, wherein the comparison between the user preferences against the program vector of the currently running programs is based on a cosine similarity value of the user preferences and the program vector.

11. The method of claim 1, wherein the comparison between the contextual user model against the program vector is based on cosine similarity of the contextual user model and the program.

12. The method of claim 1, wherein the context of the user comprises a time of a day, a day of a week, holiday, companion, 'with family', 'with friend', conditions and circumstances relevant to a program recommendation scenario.

13. The method of claim 1, further updating at least one user preference when the user preferences have deviations from a history of one or more programs watched.

14. The method of claim 1, wherein the second to be recommended list comprises a set of programs learnt for the user based on behavior learning by choosing programs with the highest similarity with the contextual user model.

15. The method of claim 1, wherein the centroid is calculated by first averaging and then normalizing a feature value for each program vector in a history of one or more programs watched.

16. A system for recommending a program to a user, the system comprising:
    a memory storing computer-executable instructions; and
    a processor configured to execute the computer-executable instructions to:
        capture user preferences stated by the user, wherein the user preferences are based on a set of features;
        store the user preferences in a normalized format;
        receive program vectors associated with currently running programs, wherein at least one program vector from amongst the program vectors is a n-dimensional vector wherein the program vectors are stored in normalized format;
        capture a user model based on programs followed by a user in a given context, wherein the user model is calculated as a centroid of a cluster formed by the program vectors;
        generate one or more contextual user models by updating the user model based on a user behavior corresponding to combination of one or more contexts, wherein the one or more contextual user models are generated based on a function f given as $f(X, C_i)=u_i$, and i=1 . . . t, and wherein X is the user, Ci is a context vector, $u_i$ is a user model and t is number of contexts;
        retrieve a contextual user model from the one or more contextual user models corresponding to a current context associated with the user;
        compare the user preferences against a program vector of the currently running programs for deriving a first to be recommended list;
        compare the contextual user model against a program vector of the currently running programs for deriving a second to be recommended list;

recommend a final list to the user derived by executing a union operation on the first to be recommended list and the second to be recommended list; and alert the user on detection of a significant difference between the user behavior and the user preferences and guide the user to modify the user preferences, wherein significant difference is detected when cosine similarity values of all the programs in the program history with the user preferences are less than a pre-defined threshold.

17. The system of claim 16, wherein the program is at least one of a television program, a radio program or a music file.

18. The system of claim 16, wherein the stated user preferences are associated with a set of features comprising genre of the program, keywords featuring characters of the program, or combination thereof.

19. The system of claim of 16, wherein the processor is further configured to execute the computer-executable instructions for updating at least one user preference when the user preferences have deviations from a history of one or more programs watched.

* * * * *